(12) United States Patent
Diehl et al.

(10) Patent No.: US 11,456,948 B2
(45) Date of Patent: Sep. 27, 2022

(54) DAISY CHAIN NETWORK OF SENSORS

(71) Applicant: Pony AI Inc., Grand Cayman (KY)

(72) Inventors: Peter G. Diehl, Shanghai (CN); Robert Dingli, Cupertino, CA (US)

(73) Assignee: Pony AI Inc., Grand Cayman (KY)

(*) Notice: Subject to any disclaimer, the term of this patent is extended or adjusted under 35 U.S.C. 154(b) by 168 days.

(21) Appl. No.: 16/569,406

(22) Filed: Sep. 12, 2019

(65) Prior Publication Data
US 2021/0083968 A1 Mar. 18, 2021

(51) Int. Cl.
*H04L 45/28* (2022.01)
*H04L 12/44* (2006.01)
*H04L 67/12* (2022.01)

(52) U.S. Cl.
CPC ............... *H04L 45/28* (2013.01); *H04L 12/44* (2013.01); *H04L 67/12* (2013.01)

(58) Field of Classification Search
CPC .......... H04L 12/44; H04L 45/28; H04L 67/12
See application file for complete search history.

(56) References Cited

U.S. PATENT DOCUMENTS

| | | | |
|---|---|---|---|
| 6,813,242 B1 * | 11/2004 | Haskin | H04Q 11/0478 370/218 |
| 8,786,191 B2 | 7/2014 | Kuang et al. | |
| 9,176,924 B2 | 11/2015 | Ricci | |
| 10,239,446 B2 | 3/2019 | May et al. | |
| 2007/0198139 A1 | 8/2007 | Boran et al. | |
| 2020/0099872 A1 * | 3/2020 | Benemann | G01S 7/4817 |
| 2020/0177522 A1 * | 6/2020 | Lo | H04B 3/50 |

* cited by examiner

*Primary Examiner* — Rhonda L Murphy
(74) *Attorney, Agent, or Firm* — Sheppard Mullin Richter & Hampton LLP

(57) ABSTRACT

Provided herein is a system and method for a sensor system on a vehicle. The sensor system comprises sensors connected with one another in a daisy chain communication network. The sensor system further comprises a controller connected to at least one of the sensors. The controller is configured to operate the vehicle based on data from the sensors and to operate the daisy chain communication network.

18 Claims, 9 Drawing Sheets

DAISY CHAIN NETWORK OF SENSORS

TECHNICAL FIELD

The present disclosure relates generally to vehicles equipped with sensors on a roof, and in particular, some embodiments relate to a daisy chain network of sensors.

BACKGROUND

Vehicles such as autonomous vehicles (AVs) may have rooftop sensors such as LiDAR or camera sensors, which supplement and bolster the vehicle's field of vision by providing accurate sensor data. The rooftop sensors may be connected to communicate with one another and with a controller. Currently, rooftop sensors may be connected via a star topology. With a star topology, a single point of failure would result in an irretrievable loss of communication at a branch at which the failure occurs. Additional concerns include aesthetics and cumulative size and thickness of wiring required for a star topology. These shortfalls are addressed by the present disclosures, which provides an efficient, robust communication system and method between sensors, such as sensors on a rooftop of a vehicle.

SUMMARY

Described herein are systems and methods for communication between sensors, such as sensors on a rooftop of a vehicle. Various embodiments of the present disclosure provide a sensor system comprising sensors connected with one another in a daisy chain communication network. The sensor system further comprises a controller connected to at least one of the sensors. The controller is configured to operate the vehicle based on data from the sensors and to operate the daisy chain communication network.

In some embodiments, a sensor of the sensors is configured to: accept a data packet from another sensor; append an additional data packet to the accepted data packet; and transmit a combined data packet comprising the accepted data packet and the additional data packet to an additional sensor or the controller. In some embodiments, the data packet and the additional data packet comprise respective timestamps indicating times at which each of the data packet and the additional data packet were captured and transmission delays of each of the data packet and the additional data packet.

In some embodiments, in response to the sensor transmitting the combined data packet to the controller, the controller is configured to process the data packet and the additional data packet based on the respective timestamps of the data packet and the additional data packet.

In some embodiments, in response to a single-point failure occurring between two neighboring sensors, one of the neighboring sensors detects the single-point failure and communicates the failure to the controller; and the controller reverses a direction of data transmission in response to the communication of the failure.

In some embodiments, the controller is configured to detect a single-point failure between two neighboring sensors based on a change over time of a throughput of data transmission between the two neighboring sensors; and in response to detecting the single-point failure between two neighboring sensors, the controller is configured to reverse a direction of data transmission.

In some embodiments, the controller is configured to detect a single-point failure between two neighboring sensors based on a difference in a throughput of data transmission between the two neighboring sensors and a throughput of data transmission between one of the two neighboring sensors and an adjacent sensor; and in response to detecting the single-point failure between two neighboring sensors, the controller is configured to reverse a direction of data transmission.

In some embodiments, in response to a sensor not comprising an input port and an output port, the sensor is connected to a custom interface box having an input port and an output port to connect with other sensors in the daisy chain communication network.

In some embodiments, the sensor system further comprises a power supply and power supply lines connected in a daisy chain network between the sensors.

In some embodiments, the sensors are connected to custom interface boxes, and further comprising: a power supply and power supply lines connected in a daisy chain network between the custom interface boxes.

In some embodiments, the sensors each comprise one input port and two output ports.

In some embodiments, the daisy chain communication network is a bidirectional communication network that transmits data in two directions at each of the sensors.

In some embodiments, one of the sensors is a trigger sensor at which data communication begins.

In some embodiments, in response to a single-point failure occurring between two neighboring sensors, the controller is configured to determine whether or not to reverse a direction of data transmission based on whether the data transmission is unidirectional or bidirectional. For example, if the data transmission is unidirectional, the controller determines to reverse the direction of data transmission. If the data transmission is bidirectional, the controller determines not to reverse the direction of data transmission.

Various embodiments of the present disclosure provide a method implemented by a sensor system on a vehicle. The method comprises assembling sensors in a daisy chain communication network, connecting a controller to at least one of the sensors, and operating the vehicle and the daisy chain communication network, by the controller, based on data from the sensors.

In some embodiments, the method further comprises, accepting, by a sensor of the sensors, a data packet from another sensor; appending, by the sensor, an additional data packet to the accepted data packet; and transmitting, by the sensor, a combined data packet comprising the accepted data packet and the additional data packet to an additional sensor or the controller. In some embodiments, the data packet and the additional data packet comprise respective timestamps indicating times at which each of the data packet and the additional data packet were captured and transmission delays of each of the data packet and the additional data packet.

In some embodiments, the method further comprises, in response to the sensor transmitting the combined data packet to the controller, processing, by the controller, the data packet and the additional data packet based on the respective timestamps of the data packet and the additional data packet.

In some embodiments, the method further comprises, in response to a single-point failure occurring between two neighboring sensors, detecting, by one of the neighboring sensors, the single-point failure and communicating the failure to the controller; and reversing, by the controller, a direction of data transmission in response to the communication of the failure.

In some embodiments, the method further comprises, detecting, by the controller, a single-point failure between two neighboring sensors based on a change over time of a throughput of data transmission between the two neighboring sensors; and in response to detecting the single-point failure between two neighboring sensors, reversing, by the controller, a direction of data transmission.

In some embodiments, the method further comprises, detecting, by the controller, a single-point failure between two neighboring sensors based on a difference in a throughput of data transmission between the two neighboring sensors and a throughput of data transmission between one of the two neighboring sensors and an adjacent sensor; and in response to detecting the single-point failure between two neighboring sensors, reversing, by the controller, a direction of data transmission.

In some embodiments, the method further comprises, in response to a single-point failure occurring between two neighboring sensors, detecting, by one of the neighboring sensors, the single-point failure and communicating the failure to the controller; and reversing, by the controller, a direction of data transmission in response to the communication of the failure, based on whether the data transmission is unidirectional or bidirectional.

In some embodiments, the method further comprises, detecting, by the controller, a single-point failure between two neighboring sensors based on a difference in a throughput of data transmission between the two neighboring sensors and a throughput of data transmission between one of the two neighboring sensors and an adjacent sensor; and in response to detecting the single-point failure between two neighboring sensors, reversing, by the controller, a direction of data transmission, based on whether the data transmission is unidirectional or bidirectional.

In some embodiments, the method further comprises, in response to a sensor not comprising an input port and an output port, connecting the sensor to a custom interface box having an input port and an output port to connect with other sensors in the daisy chain communication network.

In some embodiments, the method further comprises connecting a power supply and power supply lines between the sensors in a daisy chain network.

In some embodiments, the method further comprises connecting the sensors to custom interface boxes; and connecting a power supply and power supply lines in a daisy chain network between the custom interface boxes.

In some embodiments, the sensors each comprise one input port and two output ports to connect with other sensors. The assembling the sensors in the daisy chain communication network comprises connecting the sensors between one of two output ports of one sensor and an input port of another sensor.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In order for sensors to effectively communicate with one another, the sensors need to be connected in a robust and reliable network. For example, LiDAR and/or camera sensors on a rooftop of a vehicle need to be connected to tolerate a single-point failure, and also should be connected in a manner to reduce an amount of wiring needed. Using a daisy chain network may effectively and efficiently maintain communications between sensors. Even if a single-point failure were to occur in a daisy chain network, sensors would still be able to communicate with one another. A daisy chain network improves robustness of a sensor communication network compared to conventional star topology networks.

Figure 1:
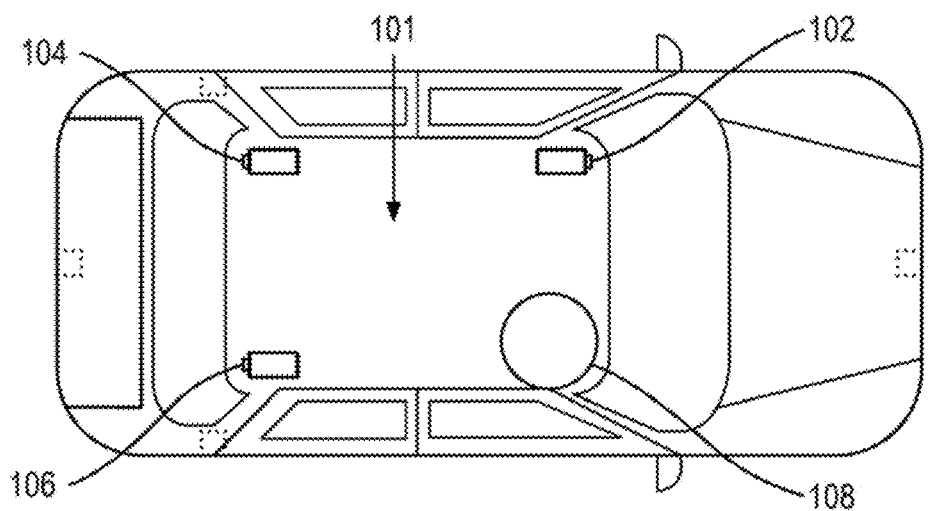
FIG. 1 illustrates an example vehicle (e.g., autonomous vehicle), according to an embodiment of the present disclosure.

FIG. 1 illustrates an example vehicle such as an autonomous vehicle 100, according to an embodiment of the present disclosure. A vehicle 100 generally refers to a category of vehicles that are capable of sensing and driving in a surrounding by itself. The vehicle 100 can include myriad sensors (camera, LiDAR, radar systems, GPS, sonar, ultrasonic, IMU (inertial measurement unit), accelerometers, gyroscopes, magnetometers, and FIR (far infrared) sensors) to detect and identify objects in the surrounding. For example, the LiDAR sensors can generate a three-dimensional map of the environment. The LiDAR sensors can also detect objects in the environment. In another example, the radar systems can determine distances and speeds of objects around the vehicle 100, and may be configured for adaptive cruise control and/or accident avoidance and blind spot detection. In another example, the cameras can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. The vehicle 100 can also include myriad actuators to propel and navigate the vehicle 100 in the surrounding.

Such actuators may include, for example, any suitable electro-mechanical devices or systems to control a throttle response, a braking action, a steering action, etc. In some embodiments, the vehicle 100 can recognize, interpret, and analyze road signs (e.g., speed limit, school zone, construction zone, etc.) and traffic lights (e.g., red light, yellow light, green light, flashing red light, etc.). For example, the vehicle 100 can adjust vehicle speed based on speed limit signs posted on roadways. In some embodiments, the vehicle 100 can determine and adjust speed at which the vehicle 100 is traveling in relation to other objects in the surroundings. For example, the vehicle 100 can maintain a constant, safe distance from a vehicle ahead (e.g., adaptive cruise control). In this example, the vehicle 100 maintains this safe distance by constantly adjusting its vehicle speed to that of the vehicle ahead.

In various embodiments, the vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 100 can effectuate any control to itself that a human driver can on a conventional vehicle. For example, the vehicle 100 can accelerate, brake, turn left or right, or drive in a reverse direction just as a human driver can on the conventional vehicle. The vehicle 100 can also sense environmental conditions, gauge spatial relationships (e.g., distances between objects and itself), detect and analyze road signs just as the human driver. Moreover, the vehicle 100 can perform more complex operations, such as parallel parking, parking in a crowded parking lot, collision avoidance, etc., without any human input.

In various embodiments, the vehicle 100 may include a rooftop 101, camera sensors 102, 104, and 106, and LiDAR sensor 108, disposed on the rooftop 101. A connection between the camera sensors 102, 104, and 106, and the LiDAR sensor 108, will be described with reference to FIGS. 2-4, and a connection between the camera sensors 102, 104, 106, and the LiDAR sensor 108 may be implemented by any of the networks described in FIGS. 2-4.

Figure 2:
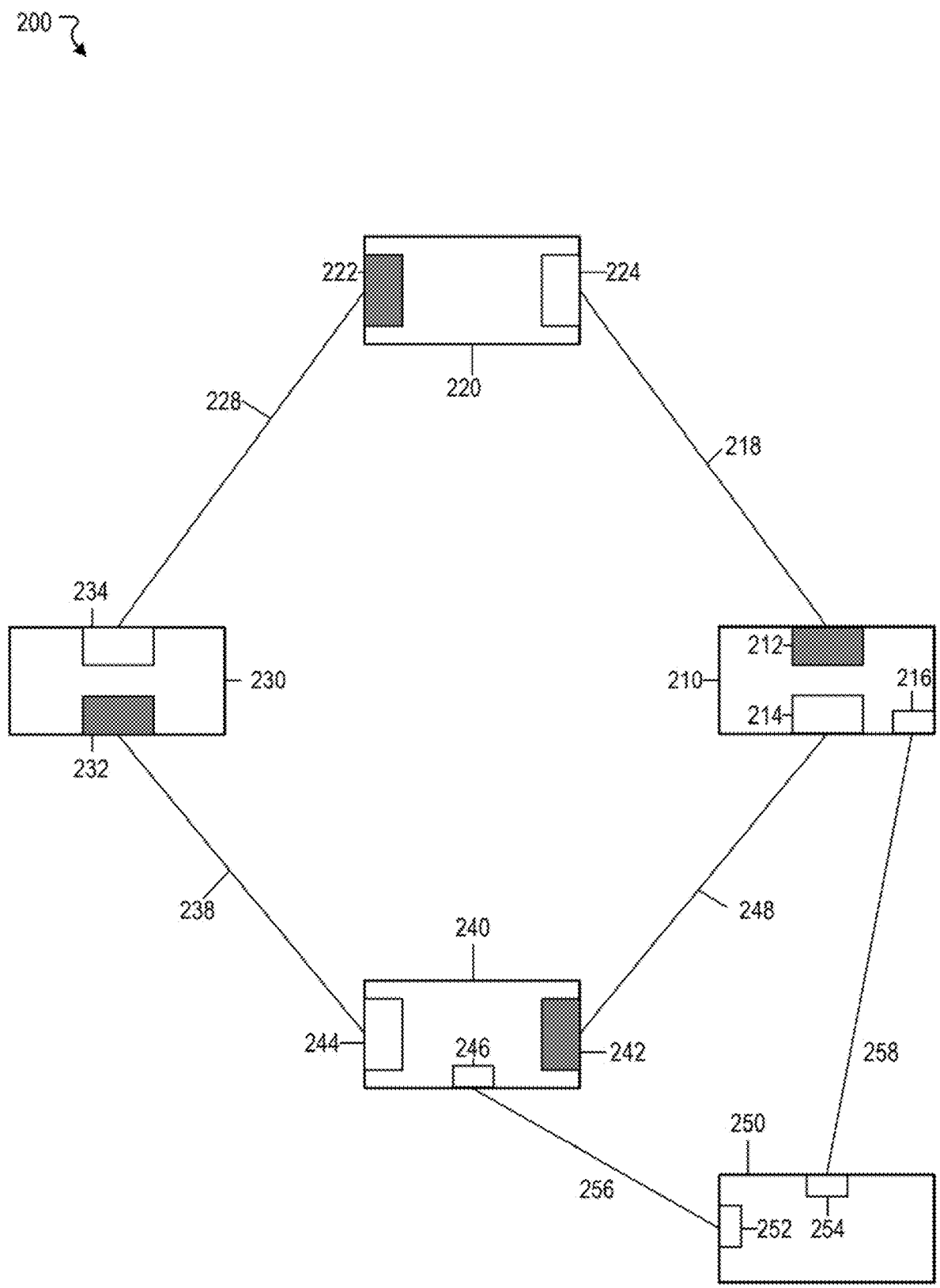
FIG. 2 illustrates an example diagram of a daisy chain network of sensors, according to an embodiment of the present disclosure.

FIG. 2 illustrates an example diagram of a daisy chain network 200 of sensors, according to an embodiment of the present disclosure. The daisy chain network 200 comprises sensors 210, 220, 230, and 240 electrically connected in a daisy chain network including wires 218, 228, 238, and 248. Each of the sensors 210, 220, 230, and 240 comprises at least one input port and one output port. The sensors 210, 220, 230, and 240 may be camera sensors. At least one of the sensors 210, 220, 230, and 240 may have a different modality, such as LiDAR or radar. The wire 218 may be connected between output port 212 of the sensor 210 and input port 224 of the sensor 220. The wire 228 may be connected between output port 222 of the sensor 220 and input port 234 of the sensor 230. The wire 238 may be connected between output port 232 of the sensor 230 and input port 244 of the sensor 240. The wire 248 may be connected between output port 242 of the sensor 240 and input port 214 of the sensor 210. The sensors 210 and 240 may be connected, via wires 256 and 258, to a controller 250. The controller 250 comprises two ports 252 and 254 that connect, respectively, to connection port 246 of the sensor 240 and connection port 216 of the sensor 210. The controller 250 may acquire and process data from the sensors 210, 220, 230, and 240 and perform operations on a vehicle such as changing a speed, turning, or changing lanes. For example, the controller 250 may adjust for a time delay of transmission of the sensors 210, 220, 230, and 240. The controller 250 may control operations of a vehicle such as vehicle 100, using data from the sensors 210, 220, 230, and 240. The controller 250 may control the operations of the network 200, such as addressing single point failures. For example, the controller 250 may reverse a direction of data transmission in response to a single point failure. In some examples, the sensors 210, 220, 230, and 240 may be disposed on a rooftop of a vehicle and the controller 250 may be disposed elsewhere on the vehicle.

The communication protocol between the sensors 210, 220, 230, and 240, and the controller 250, may be based on CAN, CAN-FD, LIN, ethernet such as Automotive Ethernet (e.g., 100Base-T1 or 1000Base-T1), or a proprietary bus protocol. The communication protocol may employ a single two-way channel, two one-way channels, or two two-way channels for extra redundancy.

Figure 3A:
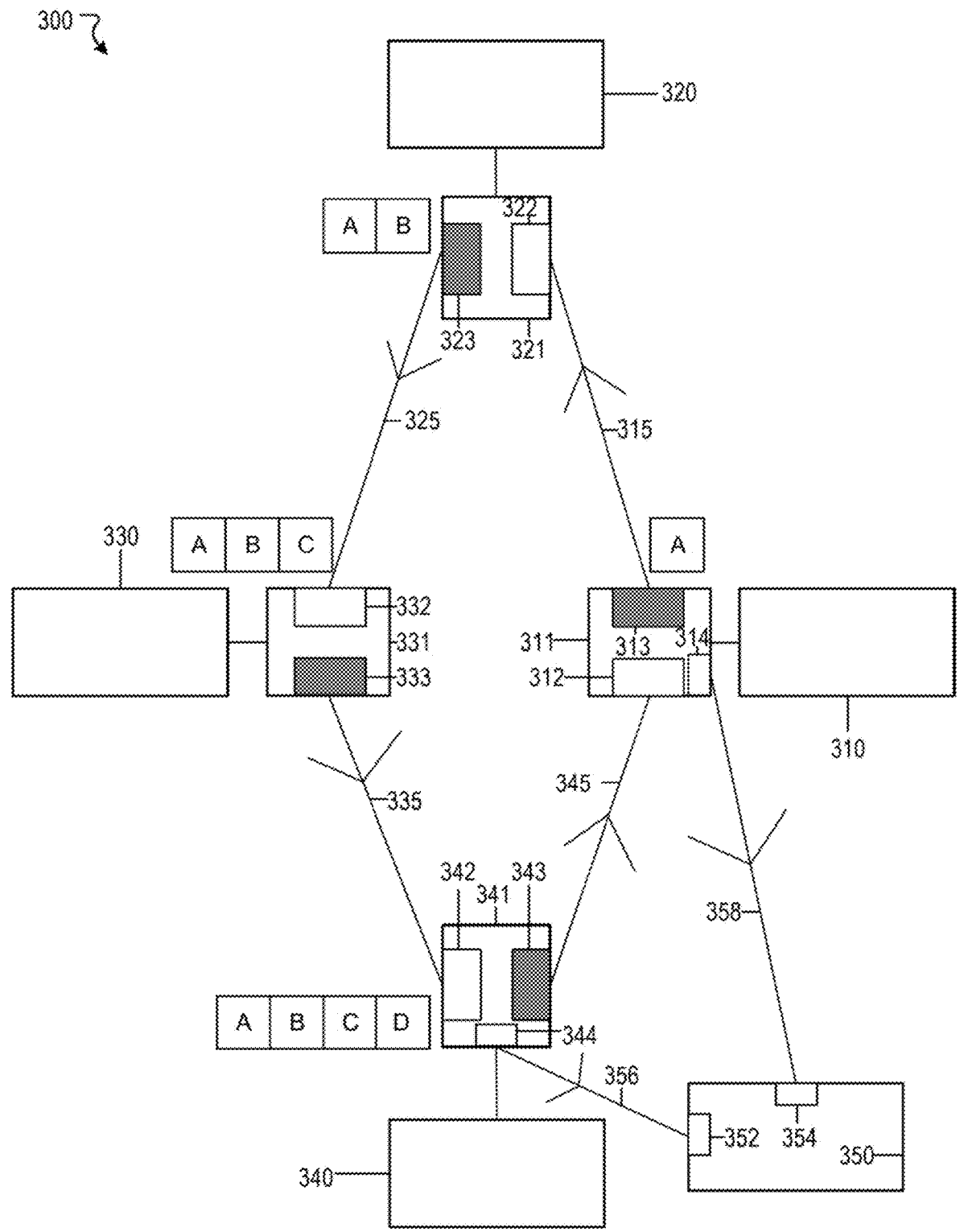
FIGS. 3A-3B illustrates an example diagram of a daisy chain network of sensors, with a transmission of data through the daisy chain network of sensors, according to an embodiment of the present disclosure.
Figure 3B:
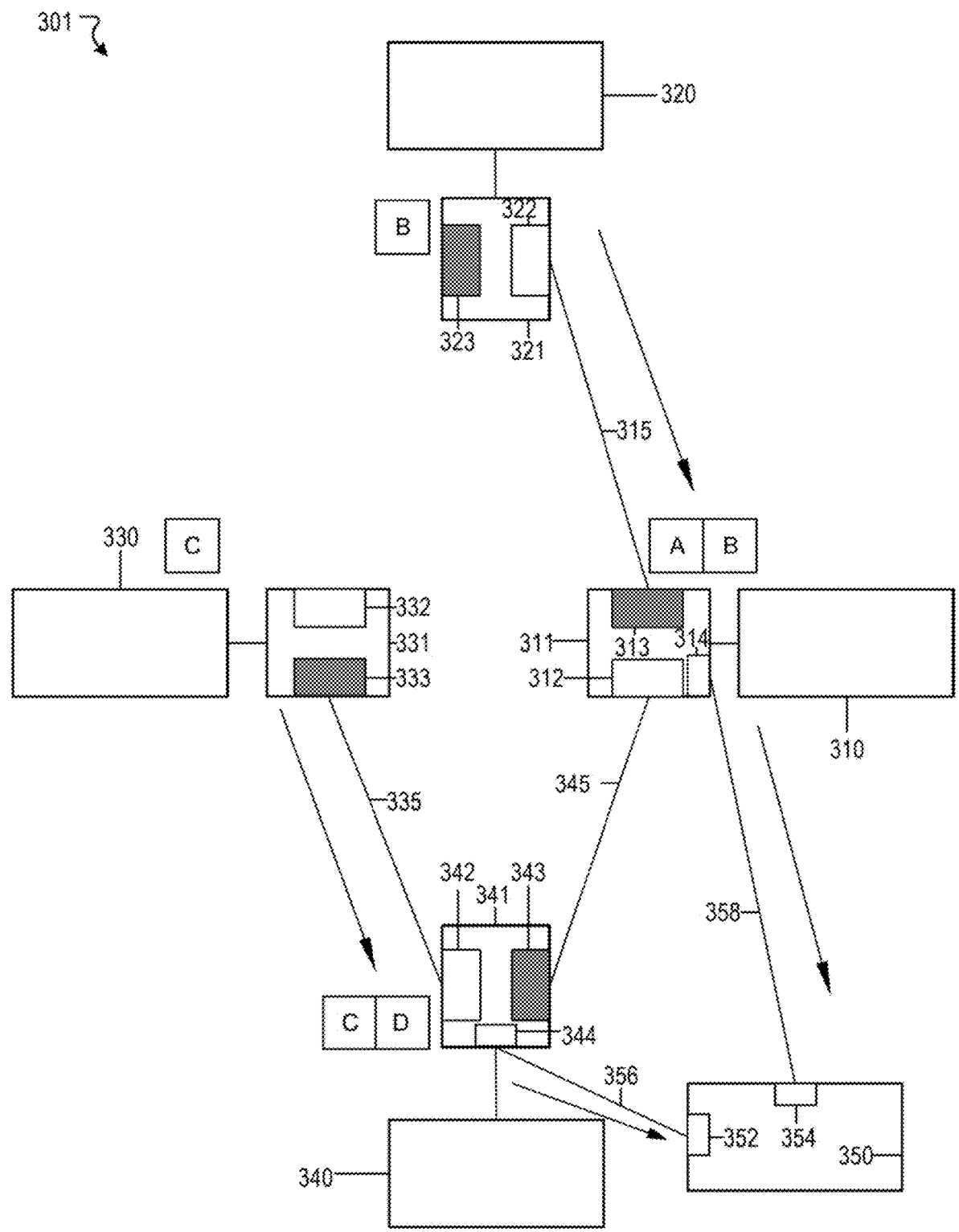

FIG. 3A illustrates an example diagram of a daisy chain network 300 of sensors, with a transmission of data through the daisy chain network 300 of sensors, according to an embodiment of the present disclosure. As an example, the daisy chain network 300 of sensors may comprise sensors 310, 320, 330, and 340. The sensors 310, 320, 330, and 340 may be camera sensors. The sensors 310, 320, 330, and 340 may be camera sensors. At least one of the sensors 310, 320, 330, and 340 may have a different modality, such as LiDAR or radar. The sensor 310 may be connected to a custom interface box 311 to facilitate connection to a daisy chain network, for example, if the sensor 310 is not equipped with two ports (one input port and one output port). The custom interface box 311 may comprise an input port 312, an output port 313, and a connection port 314. The sensor 320 may be connected to a custom interface box 321 to facilitate connection to a daisy chain network, for example, if the sensor 320 is not equipped with two ports (one input port and one output port). The custom interface box 321 may comprise an input port 322 and an output port 323. The sensor 330 may be connected to a custom interface box 331 to facilitate connection to a daisy chain network, for example, if the sensor 330 is not equipped with two ports (one input port and one output port). The custom interface box 331 may comprise an input port 332 and an output port 333. The sensor 340 may be connected to a custom interface box 341 to facilitate connection to a daisy chain network, for example, if the sensor 340 is not equipped with two ports (one input port and one output port). The custom interface box 341 may comprise an input port 342 and an output port 343.

The output port 313 of the custom interface box 311 may be connected to the input port 322 of the custom interface box 321 via a wire 315. Alternatively, the output port 313 of the custom interface box 311 may be connected directly to an input port of the sensor 320, without the custom interface box 321, for example, if the sensor 320 has an input port and an output port. The output port 323 of the custom interface box 321 may be connected to the input port 332 of the custom interface box 331 via a wire 325. Alternatively, the output port 323 of the custom interface box 321 may be connected directly to an input port of the sensor 330, without the custom interface box 331, for example, if the sensor 330 has an input port and an output port. The output port 333 of the custom interface box 331 may be connected to the input port 342 of the custom interface box 341 via a wire 335. Alternatively, the output port 333 of the custom interface box 331 may be connected directly to an input port of the sensor 340 without the custom interface box 331, for example, if the controller 340 has an input port and an output port. The output port 343 of the custom interface box 341 may be connected to the input port 312 of the custom interface box 311 via a wire 345. Alternatively, the output port 343 of the custom interface box 341 may be connected to an input port of the sensor 310. The wires 315, 325, 335, and 345 may be electrically isolated from one another so that a failure of one of the wires would not affect the other wires. The wires 315, 325, 335, and 345 may be communication channels. Additionally, power supply wires (not shown) may run between each of the sensors and may be organized in a daisy chain network.

A connection port 314 of the custom interface box 311 may be connected to a connection port 354 of a controller 350 by a wire 358. A connection port 344 of the custom interface box 341 may be connected to a connection port 352 of the controller 350 by a wire 356. The controller 350 may acquire and process data from the sensors 310, 320, 330, and 340. For example, the controller 350 may adjust for a time delay of transmission of the sensors 310, 320, 330, and 340. The controller 350 may control operations of a vehicle such as vehicle 100, using data from the sensors 310, 320, 330, and 340. For example, the controller 350 may perform operations on a vehicle such as changing a speed, turning, or changing lanes. The controller 350 may control the operations of the network 300, such as addressing single point failures. For example, the controller 350 may reverse a direction of data transmission in response to a single point failure. In some examples, the sensors 310, 320, 330, and 340 may be disposed on a rooftop of a vehicle and the controller 350 may be disposed elsewhere on the vehicle.

Data packets from the sensors 310, 320, 330, and 340 may be transmitted from each of the sensors 310, 320, 330, and 340, through the daisy chain network 300, to the controller 350. At a location of each sensor 310, 320, 330, and 340, an additional data packet may be appended. Each data packet may include a timestamp. Data transmission may be unidirectional during a single transmission. Data packet A may be transmitted from the sensor 310 through the wire 315 to the sensor 320. At the sensor 320, a data packet B may be appended to the data packet A. The combined data packet comprising A and B may be transmitted from the sensor 320, via the wire 325, to the sensor 330. At the sensor 330, a data packet C may be appended to the combined data packet comprising A and B to form a combined data packet comprising A, B, and C. The combined data packet comprising A, B, and C may be transmitted to the sensor 340, where a data packet D may be appended to produce a combined data packet comprising A, B, C, and D, which may be sent to the controller 350 via the wire 356.

The controller 350 may adjust the combined data packet A, B, C, and D based on timestamps of each of the data packets A, B, C, and D that indicate a transmission delay time of each of the data packets A, B, C, and D, to take into account different time delays of each of the data packets A, B, C, and D. For example, the data packet A may be from a camera that captured image data before the other data packets B, C, and D. Table 1 shown below depicts transmission delay times of the data packets (e.g., B, C, and D). The controller 350 may process or adjust to image data in each data packet to account for the different capture times of each data packet. The transmission delay time of each packet may be determined by a sum of a latency time and a processing time. The latency time may comprise a time consumed by a packet to travel from one sensor to another or a sensor to the controller 350, a time consumed at each sensor to analyze a header information of the packet and/or add additional data to the packet, and a storage delay of the packet at a sensor. The processing time may comprise a time consumed in appending another data packet. In some examples, the latency time for data packet A is $x1+x2+x3+x4$. $x1$ is a time consumed for the data packet A to travel from the sensor 310 to the sensor 320, and further includes preprocessing delays and postprocessing delays of the data packet A at the sensor 320. $x2$ is a time consumed for the combined data packet A and B to travel from the sensor 320 to the sensor 330, and further includes preprocessing delays and postprocessing delays of the combined data packet A and B at the sensor 330. $x3$ is a time consumed for the combined data packet A, B, and C to travel from the sensor 330 to the sensor 340, and further includes preprocessing delays and postprocessing delays of the combined data packet A, B, and C at the sensor 340. $x4$ is a time consumed for the combined data packet A, B, C, and D to travel from the sensor 340 to the controller 350, and further includes preprocessing delays and postprocessing delays of the combined data packet A, B, C, and D at the controller 350. In some examples, the processing time for data packet A is $y1+y2+y3+y4$. $y1$ indicates a time consumed for processing of the data packet A at the sensor 310. $y2$ indicates a time consumed for processing of the combined data packet A and B at the sensor 320. $y3$ indicates a time consumed for processing of the combined data packet A, B, and C at the sensor 330. $y4$ indicates a time consumed for processing of the combined data packet A, B, C, and D at the sensor 340. The transmission delay time includes a time consumed for each packet during transmission between sensors, processing at each sensor, and other delays at each sensor. The controller 350 may process or adjust to image data in each data packet to account for the different capture times of each data packet.

TABLE 1

| Data Packet | Latency Time | Processing Time | Delay Time |
| --- | --- | --- | --- |
| A | x1 + x2 + x3 + x4 | y1 + y2 + y3 + y4 | x1 + x2 + x3 + x4 + y1 + y2 + y3 + y4 |
| B | x2 + x3 + x4 | y2 + y3 + y4 | x2 + x3 + x4 + y2 + y3 + y4 |
| C | x3 + x4 | y3 + y4 | x3 + x4 + y3 + y4 |
| D | x4 | y4 | x4 + y4 |

The communication protocol between the sensors 310, 320, 330, and 340, and the controller 350, may be based on CAN, CAN-FD, LIN, ethernet such as Automotive Ethernet (e.g., 100Base-T1 or 1000Base-T1), or a proprietary bus protocol. The communication protocol may employ a single two-way channel, two one-way channels, or two two-way channels for extra redundancy.

The daisy chain network in FIG. 3A demonstrates robustness against a single point failure, for example, if a wire or a sensor were to become inoperational. For example, if the wire 325 were to become inoperational (such as being grounded due to rain, becoming an open circuit, or otherwise nonconductive), as shown in daisy chain network 301 in FIG. 3B, the controller 350 would still be able to obtain data from each of the sensors 310, 320, 330, and 340. One of the neighboring sensors 320 and/or 330 may detect that the wire 325 is inoperational (for example, based on not receiving data from a neighboring sensor for a duration) and alert the other sensors 310 and 340, and the controller 350. Additionally, one of the neighboring sensors 320 and/or 330 may increase its functionality to compensate for the inoperational wire 325. Alternatively, the controller 350 may detect that a wire or a sensor is inoperational based on a difference in a throughput of data transmission between adjacent neighboring sensors. For instance, the controller 350 may detect that the wire 325 is broken or the sensor 320 is defective if no data transmission is recorded between the sensor 320 and the sensor 330, but data transmission is recorded between the sensor 330 and the sensor 340. In some embodiments, the controller 350 may detect that the wire 325 is broken or the sensor 320 is defective in response to a change over time of a throughput of data transmission, for example, between 320 and 330.

Even with a single point failure, the controller may still obtain data from each of the sensors 310, 320, 330, and 340. To obtain data from the sensor 310, the controller 350 may reverse a transmission direction of data so that data from the sensor 310, such as data packet A, may be sent through the wire 358 to the controller 350, or through the wire 345 to the sensor 340 and through the wire 356 to the controller 350. To obtain data from the sensor 320, the controller 350 may reverse a transmission direction of data so that data from the sensor 320, such as a data packet B, may be sent through the wire 315 to the sensor 310. From the sensor 310, the data packet A may be appended to the data packet B to form a combined data packet A and B, which may then be transmitted through the wire 358 to the controller 350, or through the wire 345 to the sensor 340, at which point a data packet D may be appended, and the combined data packet A, B, and D may be transmitted through wire 356 to the controller 350.

Moreover, in the case of the single point failure, data from the sensor 330, such as the data packet C, may be sent through the wire 335 to the sensor 340, without reversing a transmission direction of data. From the sensor 340, the data packet C may be appended with the data packet D and may be sent through the wire 356 to the controller 350. Alternatively, the combined data packet C and D may be transmitted through the wire 345 to the sensor 310 and appended with the data packet A, and the combined data packet C, D, and A may be sent through the wire 358 to the controller 350.

In some embodiments, two communication channels between each of the sensors 310, 320, 330, and 340 may be provided in parallel. Each of the communication channels may support data transmission in opposite directions. For example, data transmission may occur in both directions simultaneously. In some embodiments, a single communication channel between each of the sensors 310, 320, 330, and 340 may be bidirectional. For example, a direction of transmission through the single communication channel may be adjusted by a switch. In some embodiments, two bi-directional channels between each of the sensors 310, 320, 330, and 340 may be provided.

Figure 4:
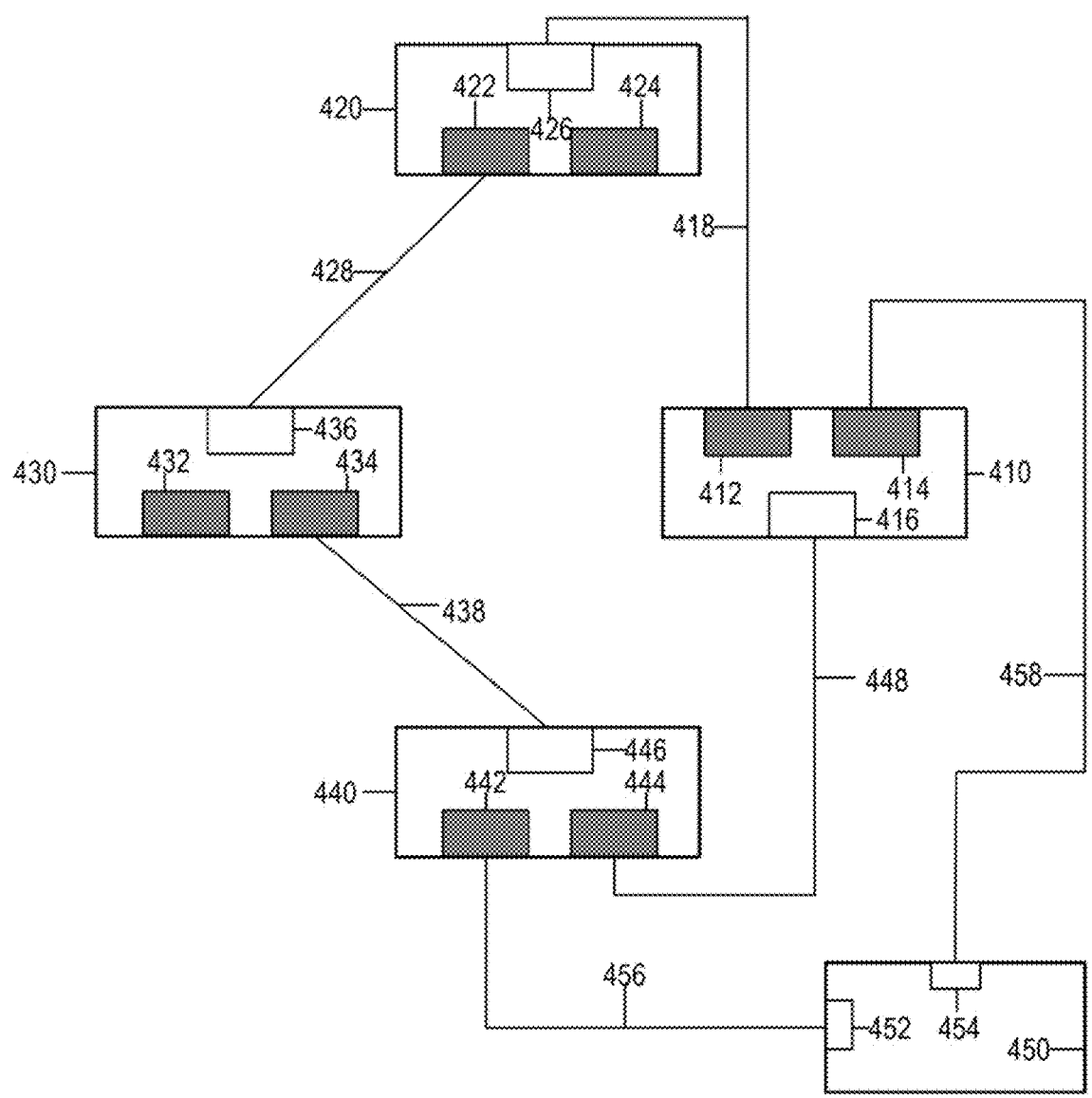
FIG. 4 illustrates an example diagram of a daisy chain network of sensors, according to an embodiment of the present disclosure.

FIG. 4 illustrates an example diagram of a daisy chain network 400 of sensors according to an embodiment of the present disclosure. In the daisy chain network 400, sensors 410, 420, 430, and 440 each have two output ports and one input port. The sensor 410 includes output ports 412 and 414 and input port 416. The sensor 420 includes output ports 422 and 424 and input port 426. The sensor 430 includes output ports 432 and 434 and input port 436. The sensor 440 includes output ports 442 and 444 and input port 446. The sensor 410 may be connected to the sensor 420 through a wire 418 between the output port 412 and the input port 426. The sensor 420 may be connected to the sensor 430 through a wire 428 between the output port 422 and the input port 436. The sensor 430 may be connected to the sensor 440 through a wire 438 between the output port 434 and the input port 446. The sensor 440 may be connected to the sensor 410 through a wire 448 between the output port 444 and the input port 416. The sensor 440 may be connected to a controller 450 through a wire 456 between the output port 442 and a connection port 452. The sensor 450 may be connected to the sensor 410 through a wire 458 between the output port 414 and a connection port 454. The controller 450 may be implemented as controller 350 or 250, for example.

The communication protocol between the sensors 410, 420, 430, and 440, and the controller 450, may be based on CAN, CAN-FD, LIN, ethernet such as Automotive Ethernet (e.g., 100Base-T1 or 1000Base-T1), or a proprietary bus protocol. The communication protocol may employ a single two-way channel, two one-way channels, or two two-way channels for extra redundancy.

Figure 5:
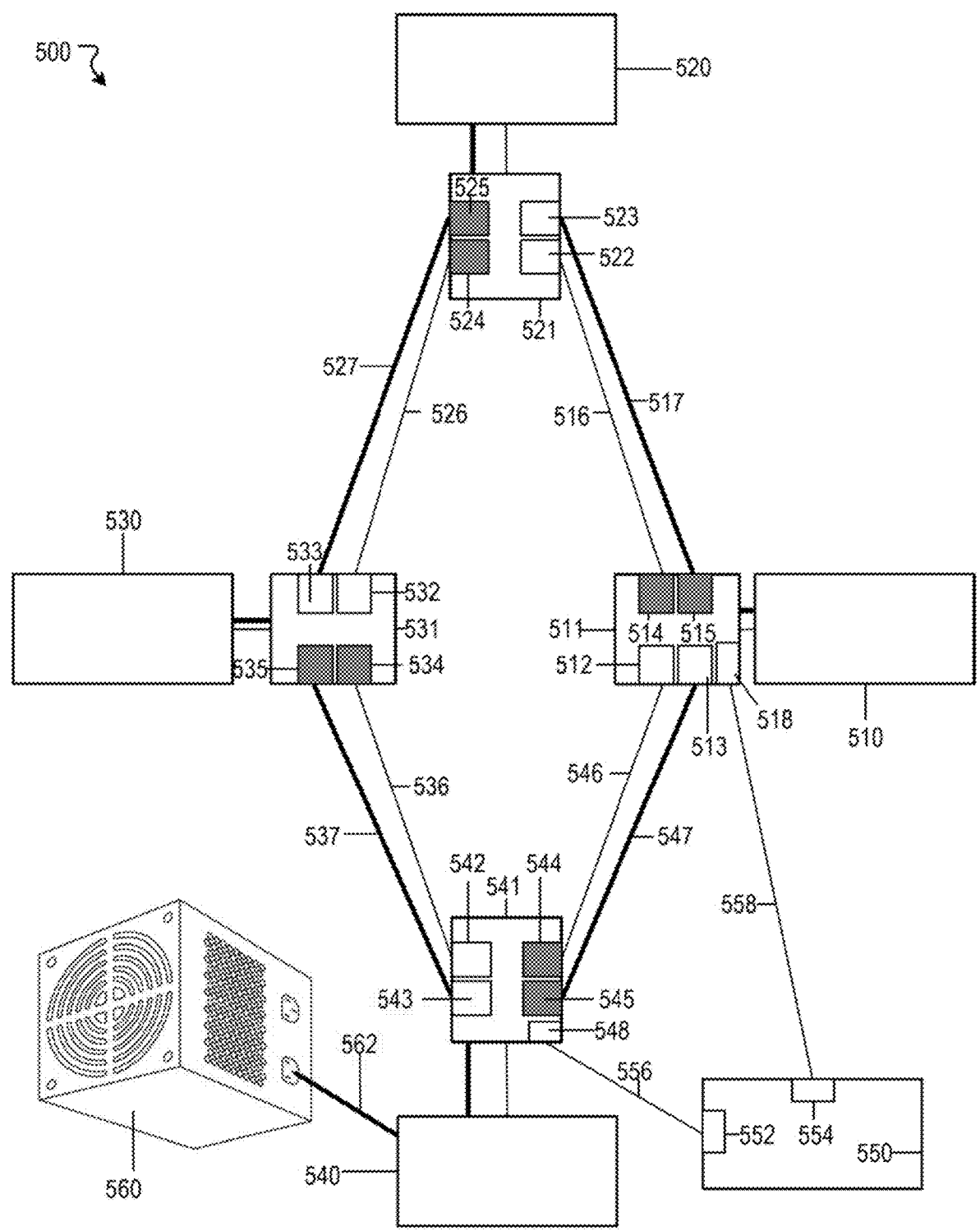
FIG. 5 illustrates an example diagram of a daisy chain network of sensors, according to an embodiment of the present disclosure.

FIG. 5 illustrates an example diagram of a daisy chain network of sensors, according to an embodiment of the present disclosure. As an example, the daisy chain network 500 of sensors may comprise sensors 510, 520, 530, and 540. The sensors 510, 520, 530, and 540 may be camera sensors. The sensors 510, 520, 530, and 540 may be camera sensors. At least one of the sensors 510, 520, 530, and 540 may have a different modality, such as LiDAR or radar. The sensor 510 may be connected to a custom interface box 511 to facilitate connection to a daisy chain network, for example, if the sensor 510 is not equipped with two ports (one input port and one output port). The custom interface box 511 may comprise input ports 512 and 513, output ports 514 and 515, and a connection port 518. The sensor 520 may be connected to a custom interface box 521 to facilitate connection to a daisy chain network, for example, if the sensor 520 is not equipped with two ports (one input port and one output port). The custom interface box 521 may comprise input ports 522 and 523, and output ports 524 and 525. The sensor 530 may be connected to a custom interface box 531 to facilitate connection to a daisy chain network, for example, if the sensor 530 is not equipped with two ports (one input port and one output port). The custom interface box 531 may comprise input ports 532 and 533, and output ports 534 and 535. The sensor 540 may be connected to a custom interface box 541 to facilitate connection to a daisy chain network, for example, if the sensor 540 is not equipped with two ports (one input port and one output port). The custom interface box 541 may comprise input ports 542 and 543, and output ports 544 and 545.

The output port 514 of the custom interface box 511 may be connected to the input port 522 of the custom interface box 521 via a wire 516. The output port 524 of the custom interface box 521 may be connected to the input port 532 of the custom interface box 531 via a wire 526. The output port 534 of the custom interface box 531 may be connected to the input port 542 of the custom interface box 541 via a wire 536. The output port 544 of the custom interface box 541 may be connected to the input port 512 of the custom interface box 511 via a wire 546. The wires 516, 526, 536, and 546 may be electrically isolated from one another so that a failure of one of the wires would not affect the other wires. The wires 516, 526, 536, and 546 may be communication channels. Additionally, power supply wires 517, 527, 537, and 547 may run between each of the custom interface boxes 511, 521, 531, and 541 and provide power to the sensors 510, 520, 530, and 540, and may be organized in a daisy chain network. The power supply wires 517, 527, 537, and

547 may be electrically connected to power supply 560 through the sensor 540 via power supply line 562. The power supply wire 517 may be connected between the output port 515 and the input port 523 of custom interface boxes 511 and 521, respectively. The power supply wire 527 may be connected between the output port 525 and the input port 533 of custom interface boxes 521 and 531, respectively. The power supply wire 537 may be connected between the output port 535 and the input port 543 of custom interface boxes 531 and 541, respectively. The power supply wire 547 may be connected between the output port 545 and the input port 533 of custom interface boxes 541 and 551, respectively. In other embodiments, the power supply wires 517, 527, 537, and 547 may be directly connected or connected between the sensors 510, 520, 530, and 540 without using the custom interface boxes 511, 521, 531, and 541.

A connection port 518 of the custom interface box 511 may be connected to a connection port 554 of a controller 550 by a wire 558. A connection port 548 of the custom interface box 541 may be connected to a connection port 552 of the controller 550 by a wire 556. The controller 550 may acquire and process data from the sensors 510, 520, 530, and 540. For example, the controller 550 may adjust for a time delay of transmission of the sensors 510, 520, 530, and 540. The controller 550 may control operations of a vehicle such as vehicle 100, using data from the sensors 510, 520, 530, and 540. For example, the controller 550 may perform operations on a vehicle such as changing a speed, turning, or changing lanes. The controller 550 may control the operations of the daily chain network 500, such as addressing single point failures. For example, the controller 550 may reverse a direction of data transmission in response to a single point failure. In some examples, the sensors 510, 520, 530, and 540 may be disposed on a rooftop of a vehicle and the controller 550 may be disposed elsewhere on the vehicle.

The communication protocol between the sensors 510, 520, 530, and 540, and the controller 550, may be based on CAN, CAN-FD, LIN, ethernet such as Automotive Ethernet (e.g., 100Base-T1 or 1000Base-T1), or a proprietary bus protocol. The communication protocol may employ a single two-way channel, two one-way channels, or two two-way channels for extra redundancy.

Figure 6:
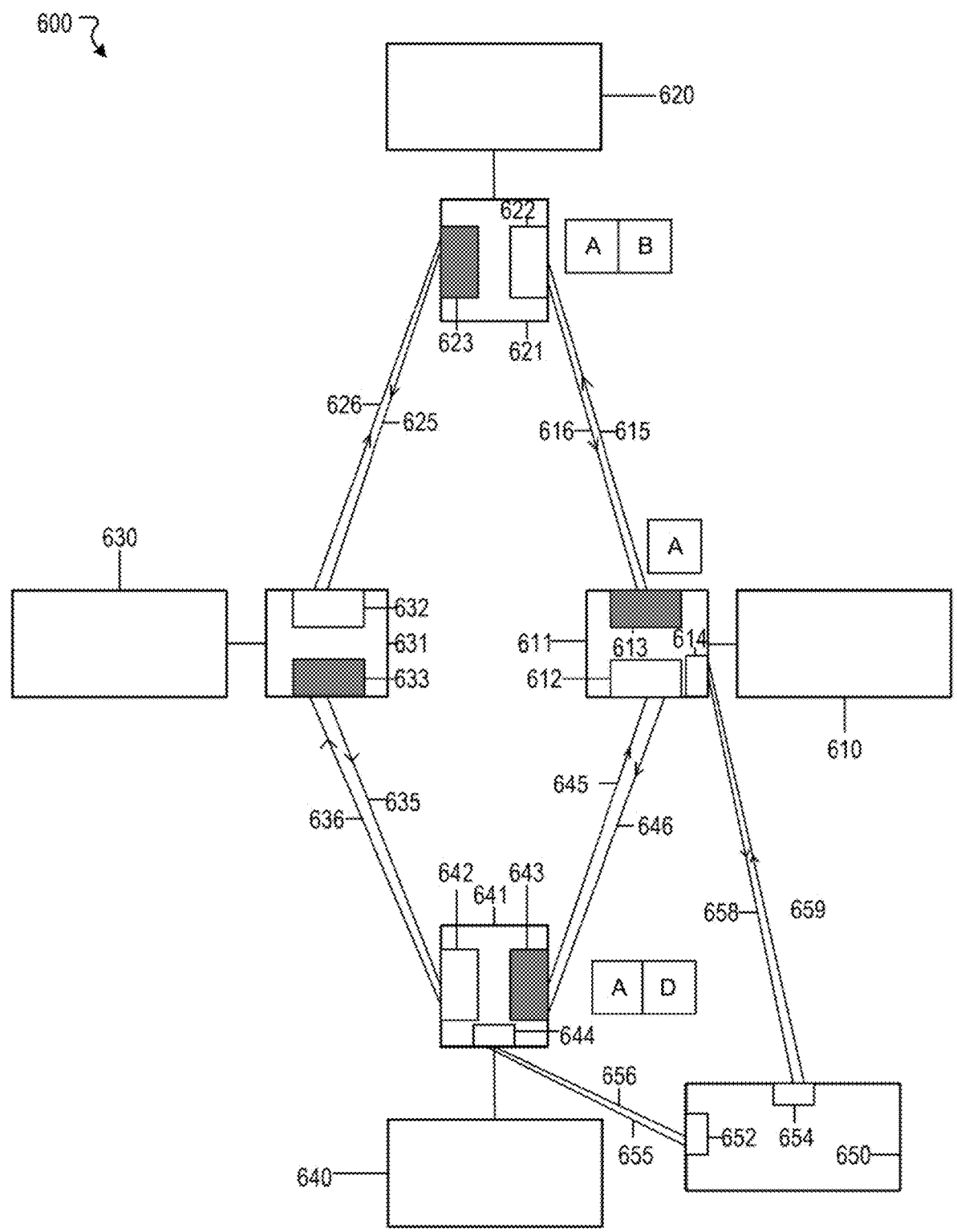
FIG. 6 illustrates an example diagram of a daisy chain network of sensors, according to an embodiment of the present disclosure.

FIG. 6 illustrates an example diagram of a daisy chain network 600 of sensors 610, 620, 630, and 640, according to an embodiment of the present disclosure. In some embodiments, two communication channels between each of the sensors 610, 620, 630, and 640 may be provided in parallel. Each of the communication channels may support data transmission in opposite directions. For example, data transmission may occur in both directions simultaneously. The sensors 610, 620, 630, and 640 may be camera sensors. The sensors 610, 620, 630, and 640 may be camera sensors. At least one of the sensors 610, 620, 630, and 640 may have a different modality, such as LiDAR or radar. The sensor 610 may be connected to a custom interface box 611 to facilitate connection to a daisy chain network, for example, if the sensor 610 is not equipped with two ports (one input port and one output port). The custom interface box 611 may comprise an input port 612, an output port 613, and a connection port 614. The sensor 620 may be connected to a custom interface box 621 to facilitate connection to a daisy chain network, for example, if the sensor 620 is not equipped with two ports (one input port and one output port). The custom interface box 621 may comprise an input port 622 and an output port 623. The sensor 630 may be connected to a custom interface box 631 to facilitate connection to a daisy chain network, for example, if the sensor 630 is not equipped with two ports (one input port and one output port). The custom interface box 631 may comprise an input port 632 and an output port 633. The sensor 640 may be connected to a custom interface box 641 to facilitate connection to a daisy chain network, for example, if the sensor 640 is not equipped with two ports (one input port and one output port). The custom interface box 641 may comprise an input port 642 and an output port 643.

The output port 613 of the custom interface box 611 may be connected to the input port 622 of the custom interface box 621 via a communication channel comprising bidirectional wires 615 and 616. Alternatively, the output port 613 of the custom interface box 611 may be connected directly to an input port of the sensor 620, without the custom interface box 621, for example, if the sensor 620 has an input port and an output port. The output port 623 of the custom interface box 621 may be connected to the input port 632 of the custom interface box 631 via a communication channel comprising bidirectional wires 625 and 626. Alternatively, the output port 623 of the custom interface box 621 may be connected directly to an input port of the sensor 630, without the custom interface box 631, for example, if the sensor 630 has an input port and an output port. The output port 633 of the custom interface box 631 may be connected to the input port 642 of the custom interface box 641 via a communication channel comprising bidirectional wires 635 and 636. Alternatively, the output port 333 of the custom interface box 331 may be connected directly to an input port of the sensor 340 without the custom interface box 331, for example, if the controller 340 has an input port and an output port. The output port 343 of the custom interface box 341 may be connected to the input port 312 of the custom interface box 311 via a communication channel comprising bidirectional wires 645 and 646. Alternatively, the output port 643 of the custom interface box 641 may be connected to an input port of the sensor 610. The wires 615, 616, 625, 626, 635, 636, 645, and 646 may be electrically isolated from one another so that a failure of one of the wires would not affect the other wires.

A connection port 614 of the custom interface box 611 may be connected to a connection port 654 of a controller 650 by bidirectional wires 658 and 659. A connection port 644 of the custom interface box 641 may be connected to a connection port 652 of the controller 650 by bidirectional wires 655 and 656. The controller 650 may acquire and process data from the sensors 610, 620, 630, and 640. For example, the controller 650 may adjust for a time delay of transmission of the sensors 610, 620, 630, and 640. The controller 650 may control operations of a vehicle such as vehicle 100, using data from the sensors 610, 620, 630, and 640. For example, the controller 650 may perform operations on a vehicle such as changing a speed, turning, or changing lanes. Because data transmission is bidirectional, the controller 650 does not need to reverse a direction of data transmission in an event of a fault because a data packet would be received by a reverse communication path. Thus, a controller (such as controller 650) may determine whether or not to reverse a direction of data transmission in response to a fault based on whether the data transmission is unidirectional or bidirectional, and take such action. For example, if the data transmission is unidirectional, the controller 650 determines to reverse the direction of data transmission. If the data transmission is bidirectional, the controller 650 determines not to reverse the direction of data transmission. In an event of a fault, data packets may be sent from one or more sensors neighboring a location of the fault. The one or more sensors neighboring a location of the fault may be set as trigger points (for example, points at which data transmission start) for data transmission. The controller 650 may arbitrate depending on a failure mode of the network 600.

Data packets from the sensors 610, 620, 630, and 640 may be transmitted from each of the sensors 610, 620, 630, and 640, through the daisy chain network 600, to the controller 650. Initially, only a single sensor (e.g., sensor 610) may be set as a trigger point to commence data transmission. At a location of each sensor 610, 620, 630, and 640, an additional data packet may be appended. Each data packet may include a timestamp. Data transmission may be bidirectional. Data packet A may be transmitted from the sensor 610 through the wire 615 to the sensor 620. At the same time, data packet A may also be transmitted from the sensor 610 through the wire 646 to the sensor 640. The controller 650 may receive each packet of data twice, but at different times. The controller 650 may discard a packet of data that has previously been received.

An exemplary scheme of bidirectional data transmission provided by the daisy chain network 600 in one embodiment is shown in Table 2. At time t1, a data packet A may be transmitted from the sensor 610 to the sensor 620, and also from the sensor 610 to the sensor 640 in an opposite direction. "A1" denotes that a data packet A is transmitted at time t1. At time t2, a data packet A1B2 (A appended with B) may be transmitted from the sensor 620 to the sensor 630, and at the same time from the sensor 620 to the sensor 610. At time t2, a data packet A1D2 may be transmitted from the sensor 640 to the sensor 630, and at the same time from the sensor 640 to the sensor 610. At time t3, data packets A1D2A3 and A1B2A3 may be transmitted from the sensor 610 to the sensor 620, and from the sensor 610 to the sensor 640. At time t3, data packets A1D2C3 and A1B2C3 may be transmitted from the sensor 630 to the sensor 640, and from the sensor 630 to the sensor 620. The controller 650 may coordinate or schedule a time and location for offloading of data packets to the controller. For example, the controller 650 may schedule the offloading of data packets after every three data transmission cycles (for example, after time t3) from the sensor 640, and/or after every four data transmission cycles from the sensor 610. For example, after time t3, data packets A1D2A3, A1B2A3, A1D2C3, and A1B2C3 would be offloaded to the controller 650.

TABLE 2

| Time | Transmission Start Point | Transmission End Point | Data Packets Transmitted |
| --- | --- | --- | --- |
| t1 | 610 | 620 | A1 |
| t1 | 610 | 640 | A1 |
| t2 | 620 | 630 | A1B2 |
| t2 | 620 | 610 | A1B2 |
| t2 | 640 | 630 | A1D2 |
| t2 | 640 | 610 | A1D2 |
| t3 | 610 | 620 | A1D2A3; A1B2A3 |
| t3 | 610 | 640 | A1D2A3; A1B2A3 |
| t3 | 630 | 640 | A1D2C3; A1B2C3 |
| t3 | 630 | 620 | A1D2C3; A1B2C3 |

The controller 650 may adjust data packets received based on timestamps of each of the data packet that indicate a transmission delay time of each of the data packets, to take into account different time delays of each of the data packets. For example, the data packet A may be from a camera that captured image data before the other data packets B, C, and D. Table 3 as shown below depicts an exemplary embodiment showing transmission delay times of the data packets (e.g., A, B, C, and D). The controller 650 may process or adjust to image data in each data packet to account for the different capture times of each data packet.

TABLE 3

| Data Packet | Latency Time | Processing Time | Delay Time |
| --- | --- | --- | --- |
| A | x1 + x2 + x3 + x4 | y1 + y2 + y3 + y4 | x1 + x2 + x3 + x4 + y1 + y2 + y3 + y4 |
| B | x2 + x3 + x4 | y2 + y3 + y4 | x2 + x3 + x4 + y2 + y3 + y4 |
| C | x3 + x4 | y3 + y4 | x3 + x4 + y3 + y4 |
| D | x4 | y4 | x4 + y4 |

In some embodiments, the controller 650 may implement measures to ensure security of data transmission. In some examples, the controller 650 may verify a source of a data packet using identification information including header information and sync field information. In some examples, the controller 650 may authenticate a source of a data packet using timestamps of the data packet, based on an expected time of data transmission (accounting for transmission delays) from the sensors 610, 620, 630, and/or 640 to the controller. If the timestamp of the data packet is outside a range of an expected time of data transmission, the controller 650 may determine that the data packet is not authentic.

Figure 7:
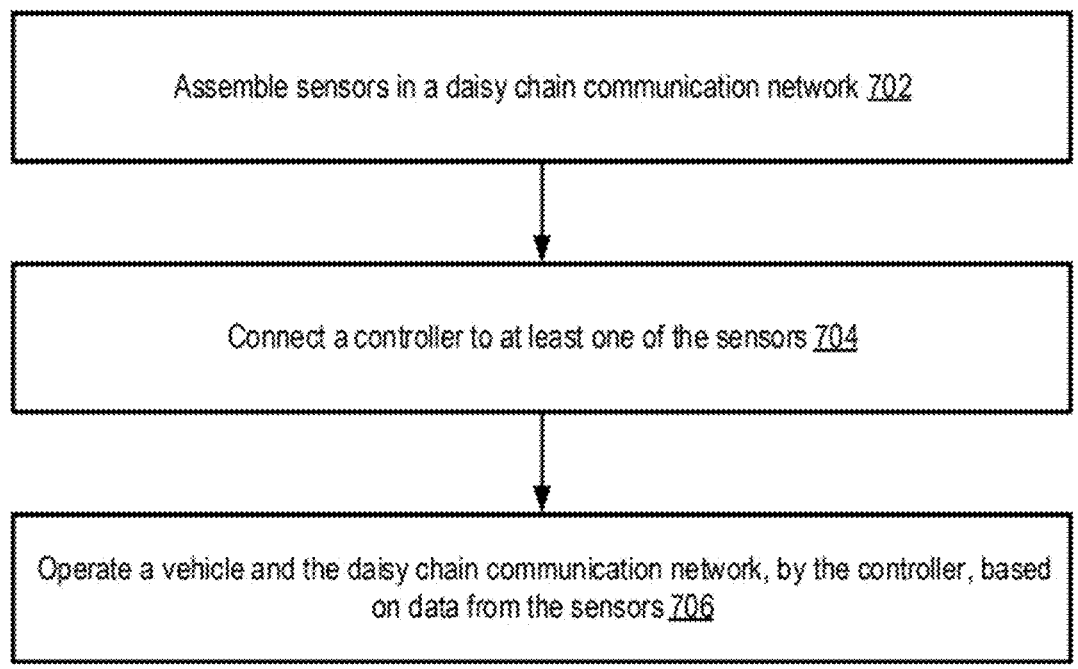
FIG. 7 illustrates an flowchart of an example of a method to of assembling a daisy chain network, according to some embodiments.

FIG. 7 illustrates a flowchart of a method to assembly sensors in a daisy chain communication network according to some embodiments. In this and other flowcharts, the flowchart 800 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 7.

In step 702, sensors may be assembled in a daisy chain communication network. In step 704, a controller may be connected to at least one of the sensors. In step 706, the controller may operate a vehicle and the daisy chain communication network based on data from the sensors.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
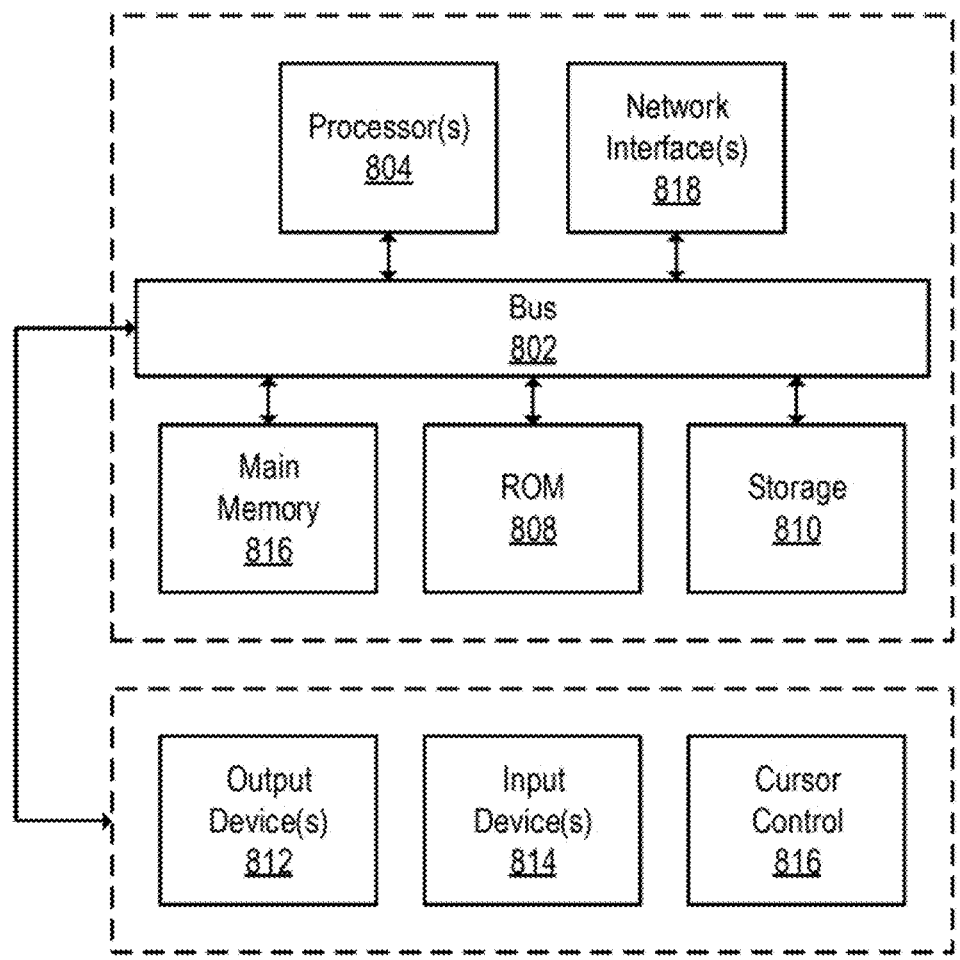
FIG. 8 is a diagram of an example computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A sensor system on a vehicle, comprising:
sensors connected with one another in a daisy chain communication network; and
a controller connected to at least one of the sensors, the controller being configured to:
   detect a single-point failure between two neighboring sensors based on a difference in a throughput of data transmission between the two neighboring sensors and a throughput of data transmission between one of the two neighboring sensors and an adjacent sensor;
   in response to detecting the single-point failure between two neighboring sensors, determine whether the data transmission is unidirectional;
   in response to the data transmission being unidirectional, reverse a direction of data transmission such that data which was previously transmitted in a direction from a first sensor of the neighboring sensors to a second sensor of the neighboring sensors becomes transmitted in a reverse direction from the second sensor to the first sensor;
   receive first and second timestamps and first and second packets from the first and second sensors;
   append the first packet and the second packet;
   adjust the appended first and second packet based on a first duration consumed in analyzing a first header of the first packet, a second duration consumed in analyzing a second header of the second packet, a third duration consumed in appending the first packet and the second packet, a fourth duration consumed in storing the first packet at the first sensor, and a fifth duration consumed in storing the second packet at the second sensor; and
   operate the vehicle based on the adjusted appended first and second packet and to operate the daisy chain communication network.

2. The sensor system of claim 1, further comprising a third sensor, wherein:
the third sensor of the sensors is configured to:
   accept the appended first and second packet from the first sensor or the second sensor;
   append the appended first and second packet to a third packet corresponding to the third sensor; and
   transmit a combined packet comprising the appended first and second packet and the third packet to a fourth sensor or the controller; and
the third packet comprises a timestamp indicating a time at which the third packet was captured and a transmission delay of the third packet.

3. The sensor system of claim 2, wherein:
the third sensor transmits the combined packet to the controller; and
in response to the third sensor transmitting the combined packet to the controller, the controller is configured to process the combined packet and the third packet based on the timestamp of the third packet.

4. The sensor system of claim 1, wherein:
in response to a single-point failure occurring between the two neighboring sensors, one of the neighboring sensors detects the single-point failure and communicates the failure to the controller; and
the controller reverses a direction of data transmission in response to the communication of the failure.

5. The sensor system of claim 1, wherein:
the controller is configured to detect a single-point failure between the two neighboring sensors based on a change over time of a throughput of data transmission between the two neighboring sensors.

6. The sensor system of claim 1, wherein:
in response to the first sensor not comprising an input port and an output port, the first sensor is connected to a custom interface box having an input port and an output port to connect with other sensors in the daisy chain communication network.

7. The sensor system of claim 1, further comprising a power supply and power supply lines connected in a daisy chain network between the sensors.

8. The sensor system of claim 1, wherein: the sensors are connected to custom interface boxes, and further comprising:
a power supply and power supply lines connected in a daisy chain network between the custom interface boxes.

9. The sensor system of claim 1, wherein the sensors each comprise one input port and two output ports.

10. The sensor system of claim 1, wherein the daisy chain communication network is a bidirectional communication network that transmits data in two directions at each of the sensors.

11. The sensor system of claim 10, wherein, one of the sensors is a trigger sensor at which data communication begins.

12. The sensor system of claim 1, wherein, in response to a single-point failure occurring between the two neighboring sensors, the controller is configured to determine whether or not to reverse a direction of data transmission based on whether the data transmission is unidirectional or bidirectional.

13. The sensor system of claim 1, wherein the controller is further configured to:
in response to the data transmission being determined to be bidirectional, maintain a direction of the data transmission.

14. A method implemented by a sensor system on a vehicle, the method comprising:
assembling sensors in a daisy chain communication network;
connecting a controller to at least one of the sensors;
detecting, by the controller, a single-point failure between two neighboring sensors based on a difference in a throughput of data transmission between the two neighboring sensors and a throughput of data transmission between one of the two neighboring sensors and an adjacent sensor;
in response to detecting the single-point failure between two neighboring sensors, determining, by the controller, whether the data transmission is unidirectional;
in response to the data transmission being unidirectional, reversing, by the controller, a direction of data transmission such that data which was previously transmitted in a direction from a first sensor of the neighboring sensors to a second sensor of the neighboring sensors becomes transmitted in a reverse direction from the second sensor to the first sensor;
receiving first and second timestamps and first and second packets from the first and second sensors;
appending the first packet and the second packet;
adjusting the appended first and second packet based on a first duration consumed in analyzing a first header of the first packet, a second duration consumed in analyzing a second header of the second packet, a third duration consumed in appending the first packet and the second packet, a fourth duration consumed in storing the first packet at the first sensor, and a fifth duration consumed in storing the second packet at the second sensor; and operating the vehicle and the daisy chain communication network, by the controller, based on data from the sensors.

15. The method of claim 14, further comprising:

accepting, by a third sensor of the sensors, the appended first and second packet from the first sensor or the second sensor;

appending, by the third sensor, the appended first and second packet to a third packet corresponding to the third sensor; and transmitting, by the sensor, a combined packet comprising the appended first and second packet and the third packet to a fourth sensor or the controller, and wherein, the third packet comprises a timestamp indicating a time at which the third packet was captured and a transmission delay of the third packet.

16. The method of claim 15, further comprising:
transmitting, by the third sensor, the combined packet to the controller; and in response to the third sensor transmitting the combined data packet to the controller, processing, by the controller, the combined packet and the third packet based on the timestamp of the third packet.

17. The method of claim 14, further comprising:

in response to a single-point failure occurring between the two neighboring sensors, detecting, by one of the neighboring sensors, the single-point failure and communicating the failure to the controller; and reversing, by the controller, a direction of data transmission in response to the communication of the failure, based on whether the data transmission is unidirectional or bidirectional.

18. The method of claim 14, further comprising:
connecting the sensors to custom interface boxes; and
connecting a power supply and power supply lines in a daisy chain network between the custom interface boxes.

* * * * *